United States Patent [19]

Hughes et al.

[11] 3,792,378

[45] Feb. 12, 1974

[54] DIGITALLY CONTROLLED RF SWEEP GENERATOR

[75] Inventors: Alexander S. Hughes, College Park; Sidney A. Taylor, Silver Spring, both of Md.

[73] Assignee: The United States of America as represented by the Secretary of the Navy, Washington, D.C.

[22] Filed: Sept. 8, 1971

[21] Appl. No.: 178,788

[52] U.S. Cl. .................... 331/178, 331/179, 332/16, 332/29, 340/347 DA

[51] Int. Cl. .......................................... H03b 19/00

[58] Field of Search ............ 331/178, 179; 323/101; 328/155; 332/16, 29

[56] References Cited

UNITED STATES PATENTS

| | | | |
|---|---|---|---|
| 3,502,976 | 3/1970 | Chamberlin, Jr. et al. | 328/155 |
| 3,283,254 | 11/1966 | Haynie | 331/178 |
| 3,444,396 | 5/1969 | Fox | 328/155 |
| 3,517,323 | 6/1970 | Rudin, Jr. | 328/155 |
| 3,636,477 | 1/1972 | Selz | 328/155 |

*Primary Examiner*—Maynard R. Wilbur
*Assistant Examiner*—N. Moskowitz
*Attorney, Agent, or Firm*—R. S. Sciascia; Q. E. Hodges

[57] ABSTRACT

An RF signal is inputted to a digitally controlled RF phase shifter. The RF phase shifter is responsive to digital signal commands and operates to shift the phase of the RF input signal and its frequency in response to the digital signal input. The relationship between change in frequency versus change in phase over a time interval requires that the phase shift rate of change be varied parabolically for the frequency to change linearly with time. The phase change is, therefore, accomplished by parabolically incrementing the digital count, relative to time. The RF frequency is thereby linearly swept about the RF center frequency.

10 Claims, 6 Drawing Figures

INVENTORS
ALEXANDER S. HUGHES
SIDNEY A. TAYLOR
BY Joel Rosenblatt AGENT
ATTORNEY INVENTORS
ALEXANDER S. HUGHES
SIDNEY A. TAYLOR
BY Joel Rosenblatt AGENT
R C Hodges ATTORNEY INVENTORS
ALEXANDER S. HUGHES
SIDNEY A. TAYLOR
BY Joel Rosenblatt AGENT
[signature] ATTORNEY INVENTORS
ALEXANDER S. HUGHES
SIDNEY A. TAYLOR
BY
Joel Rosenblatt AGENT
[signature] ATTORNEY

DIGITALLY CONTROLLED RF SWEEP GENERATOR

SUMMARY OF THE INVENTION

The basic unit of the digitally controlled sweep frequency generator is digitally controlled phase shifter. The phase shifter shown in this disclosure has five digital bits arranged to provide 360° of phase shift in 11 ¼° steps.

Generally, any phase shifter may be used which has digitally arranged bits to provide 360° of phase shift on command and in 360/n steps, where n is the number of bits. For the sake of explanation, the five bit phase shifter is chosen.

Its most significant bit produces 180° phase shift with logic input "1." The least significant bit produces 11 ¼° phase shift with the logic input "1." The other three bits operate similarly to produce phase shifts of 22 ½°, 45°, and 90°. Inputted to the RF phase shift is an RF signal at a center frequency $f_0$. The frequency sweep out of the phase shifter is $f_0 \pm f\,\Delta$.

The frequency out is a function of the rate of change of phase, or the first derivative of phase with respect to time. When the rate of phase shift is held constant at $\gamma$, the frequency $f\gamma$ out of the phase shifter will be a function of the rate of phase shift $[d\phi/dt]$. But if the rate of phase shift is varied, it can be seen that the frequency out will change at a rate proportionate to the changing rate of phase shift. The rate of change of the RF frequency is held linear by maintaining the rate of phase shift proportional to the square of time ($t^2$) or parabolically with respect to time.

To produce an RF output sweep extending from a maximum, $f_0+f\,\Delta$, through a mid point, $f_0$, to a minimum, $f_0-f\,\Delta$, the phase shift is made to increase, at a decreasing rate of change until a zero rate of phase shift is reached, corresponding to the mid point or center frequency $f_0$. From the center frequency point $f_0$ to the minimum frequency, phase shift is made to decrease, but the rate of change of phase shift between the point of the center frequency and the minimum sweep frequency is made to increase. When the point of minimum frequency is reached, the digital logic is programmed to flyback, bringing the output frequency to its maximum $f_0+f\,\Delta$ and repeating the process described.

The digital commands are generated by a crystal clock inputted to a frequency divider. The divider divides the crystal clock frequency into a number of frequency outputs with the lowest frequency pulse period corresponding to a unit time interval of the sweep period. A differentiator connected to the output of the frequency divider produces narrow pulses from the divider output and these pulses are applied to a gating and combining circuit which control the number of pulses delivered to the binary counter from the differentiator during any one unit time interval within the sweep period.

An up-down command flip-flop is connected to an up-down control register and to the binary up-down counter. The output of the binary up-down counter and the control register may be either increasing or decreasing with the RF digitally controlled phase shift changing in response to the changing count of the up-down binary counter. The up-down command flip-flop controls the directions in which the binary counter and control registers count.

The control up-down register input is connected to the lowest frequency pulse output of the differentiator. The control up-down register is time keyed to the lowest frequency output of the frequency divider and thereby controls the period of the sweep and the sweep frequency maximum and minimum.

For a sweep decreasing in frequency with respect to time, the up-down command module sets the binary counter to count up and the control register to count down. The phase shift is increased or advanced at a decreasing rate until $f_0$ is reached, corresponding to zero rate of phase shift. The up-down command module then commands the binary counter to count down and the control register to count up, retarding or decreasing the phase shift at an increasing rate of change.

Because this technique is digital, one requirement is that the frequency corresponding to the unit time interval be substantially higher than the sweep frequency period. When the parameters of the digitally controlled sweep frequency oscillator are designed with this limitation the advantages of this generator are far superior than comparable methods now existing in the art. For one, the sweep frequency output is more substantially linear. The linearity needs no adjustment as it is built into the digital logic. In addition, the sweep form of the sweep is easily changed to suit additional uses by simply adding more logic rather than costly RF hardware.

Accordingly, it is the object of this invention to digitally sweep the output of an RF generator to use digital signals to incrementally phase shift an RF input signal thereby changing the RF output frequency.

DESCRIPTION OF THE PREFERRED EMBODIMENT

Figure 1A:
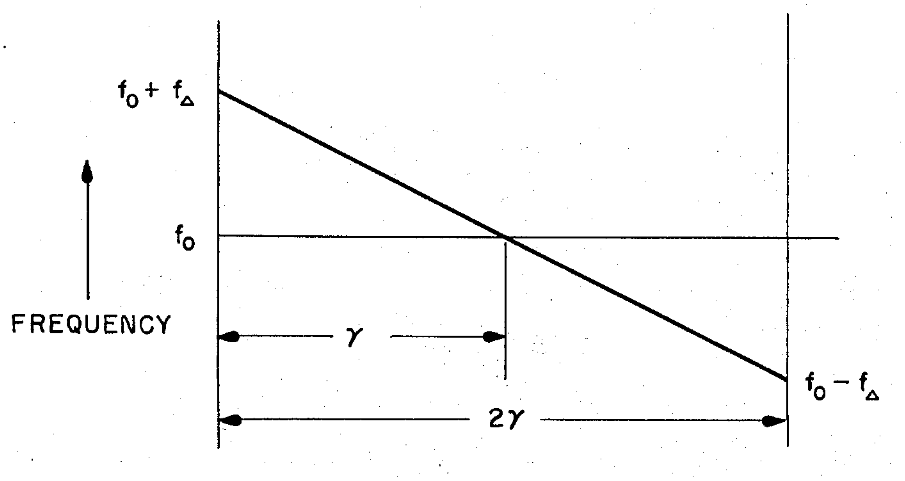
FIG. 1*a* is a time diagram of the sweep frequency output.

The sweep output of the RF phase shifter is as shown in FIG. 1*a*, to be an RF signal of changing frequency having a center frequency at $f_0$ and being swept from a maximum frequency $f_0 + f_\Delta$ to a minimum frequency $f_0 - f_\Delta$. The frequency at any point in time, $f(t)$, may be expressed $f(t) = At+B$, where A and B are constants.

However, the RF frequency out is a function of the rate of RF phase change, $f(t) = Kd\,(\phi/dt)$. The phase ($\phi$) may then be expressed: $\phi\,(t) = \int f(t)\,dt$; where $f(t) = At+B$ $\phi$ then is equal to $\int (At+B)dt = A\,(t^2/2) + Bt$.

Figure 1B:
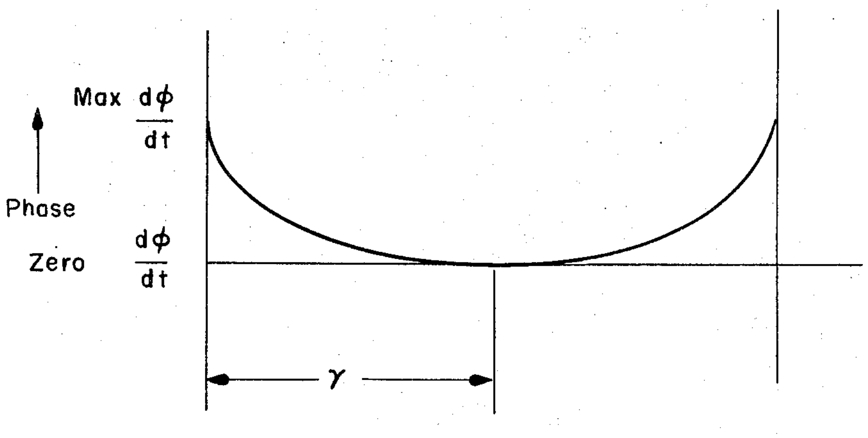
FIG. 1*b* is a time diagram, utilizing the time base of FIG. 1*a*, of the rate of change of phase.

The term $Bt$ represents constant frequency, $f_0$. The term $At^2/2$ expresses the relationship between frequency and phase. For the frequency to change linearly, the rate of phase change must vary parabolically, or as the square of time. The time diagram of the rate of phase shift required to produce a linear change in frequency as shown in FIG. 1*a*, is as shown in FIG. 1*b*. The rate of phase change is shown decreasing at a decreasing rate between $f_0+f\ \Delta$ and $f_0$ and the increasing at an increasing rate between $f_0$ and $f_0-f\ \Delta$, producing the sweep as shown in FIG. 1*a*.

The sweep shown in FIGS. 1*a* and 1*b*, are continuous sweeps. But this digital technique differs from the time diagrams shown in that the phase is digitally stepped in small increments relative to the time interval *t* so that the stepped rate of change of frequency is substantially linear but not continuous as shown.

Figure 2:
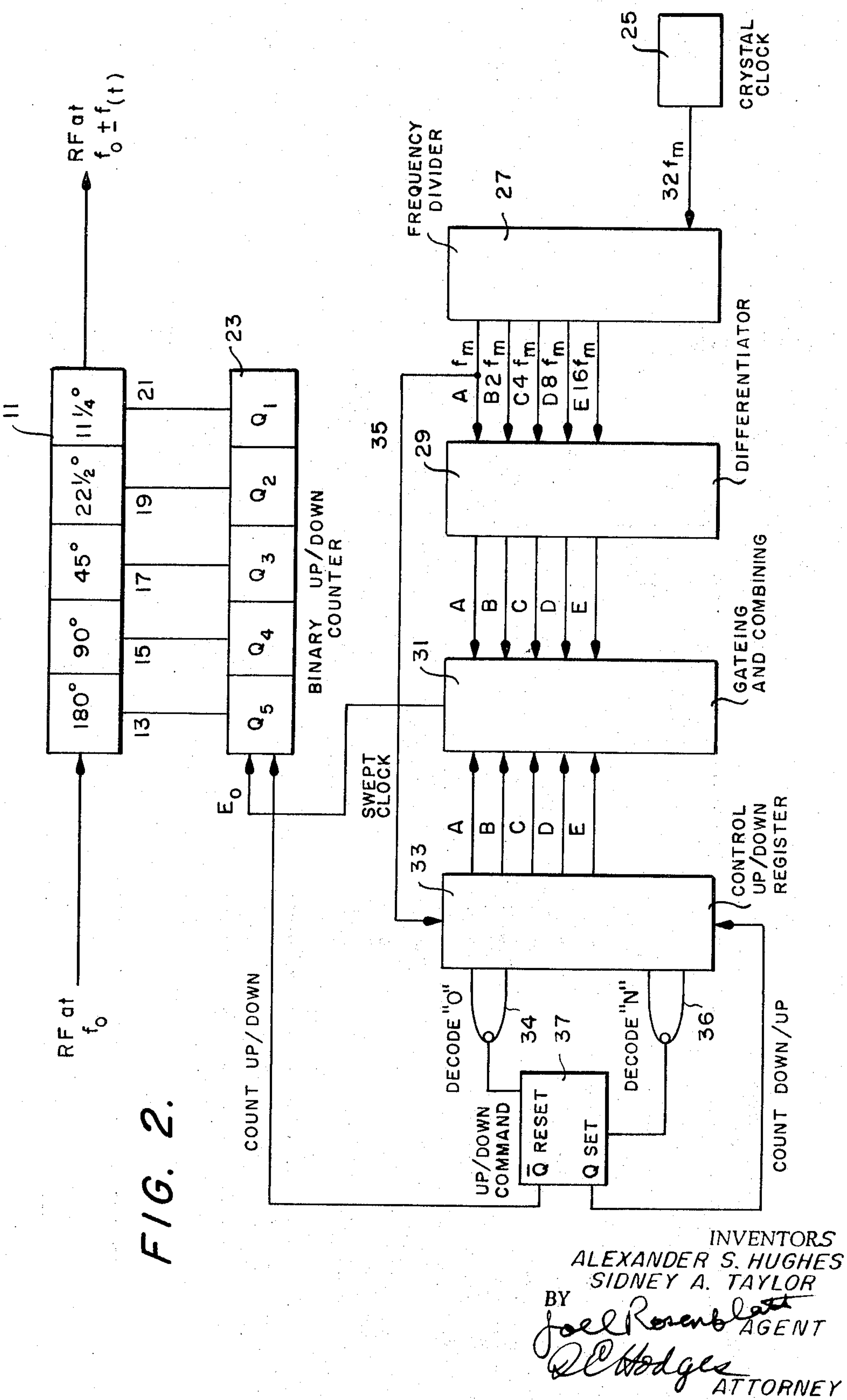
FIG. 2 is a block diagram of the invention.

The apparatus for producing this sweep is shown in FIG. 2. The apparatus consists of an RF phase shifter 11, having an RF signal inputted to it at frequency $f_0$ and having an output frequency signal to $f_0 \pm f(t)$. The phase shifter 11 has five digital inputs 13, 15, 17, 19 and 21, with each digital input connected to a respective output of the binary up-down counter 23. As shown above, the frequency output of phase shifter 11 is dependent upon the RF signal in and the rate of phase shift.

The digitally controlled phase shifter 11 is shown as having five digital bits arranged to provide 360° of phase shift on digital command and in steps of 11 ¼°. The most significant bit produces 180° shift with logic "1" at input at 13 from binary up-down counter output $Q_5$ and the least significant bit from binary up-down counter output $Q_1$ producing an 11 ¼° shift with logic "1" at input 21. The other three bits operates similarly to produce 22 ½°, 45° and 90° phase shift. It can be seen that by arranging the binary output of the binary up-down counter, any phase shift between 0° and 348 ¾° in 11 ¼° steps can be generated.

As shown for the sake of explanation, the RF phase shifter 11 is limited to five bits and the binary up-down counter associated with the five bit phase shifter also has five bits. The crystal clock is therefore divided into five binary related frequencies. It is to be understood however, that the invention is not limited to the specific embodiment shown. The number of phase shift increments per unit time interval and the size of the associated binary up-down counter and the number of frequency divider output channels is dependent upon the application of the device. The phase shift response to a change in the binary count may be varied without departing from the spirit of this invention.

If the binary commands to the phase shifter are caused to increase linearly with time, phase shift changes smoothly in 11 ¼° steps from 0 to 348 ¾° at a rate corresponding to the rate of the digital commands.

However, as shown before, the phase must change at a rate equal to $t^2$ or parabolically with respect to time. The technique for generating the parabolically changing phase shift with respect to time utilizes crystal clock 25 as a stable frequency source.

The output of crystal clock 25 is divided by frequency divider 27 into five output frequencies, the frequencies being binarily related with the lowest frequency output fm appearing on channel A.

The frequency appearing on channel B is 2 fm, the frequency on channel C is 4 fm, on channel D the frequency is 8 fm and on channel E the frequency is 16 fm with the crystal clock frequency being 32 fm. As can be seen, all the frequencies on channels A–E and the crystal clock frequency are binarily related.

Figure 3:
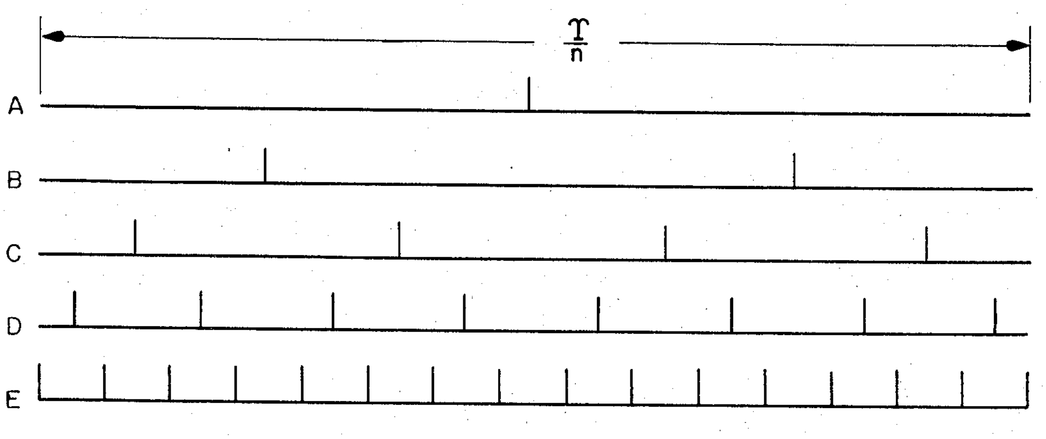
FIG. 3 is a time diagram of all the pulse outputs of differentiator 29, within a unit time interval.

The output of differentiator 29, connected to frequency divider 27 by corresponding channels A–E is as shown in FIG. 3, with one pulse appearing per unit of time $Y/n$ on channel A, two pulses appearing on the same unit time interval $Y/n$ on channel B, etc., with channel E having 16 pulses appearing during the basic unit time interval $Y/n$. As shown in FIG. 3, no two pulses from channels A–E coincide in time.

A gating and combining circuit 31, connected to the output of the differentiator 29, selects the outputs of channels A–E singularly or in combination for each specific time interval $Y/n$ and thereby controls the rate of change of the binary up-down counter 23 and the output frequency of phase shifter 11. The operation of the gating and combining circuit 31 is explained below in detail.

A control up-down register 33 is synchronized with the lowest frequency output fm of frequency divider 27 and is connected thereto by interconnection 35. As the number of pulses on line $E_0$, updating the binary up-down counter during each successive unit time interval $Y/n$ changes and is therefore different for each time interval, the control up-down register must be capable of counting the elapsed unit time intervals and controlling the gating and combining circuit 31 in its selection of the proper output channels (A–E) of the frequency divider for the next interval.

The control up-down register is itself a counter which counts by two's for each pulse per unit time interval $Y/n$ received.

Up-down commands to the control register and the binary counter are developed by the flip-flop/up-down command module 37. At the start of the sweep, the frequency out must be $f_0+f\ \Delta$. The binary counter is therefore set to count up and the control register is set to count down.

When the rate of phase shift is zero, corresponding to a frequency out, $f_0$, the count on register 33 will be 00000. Comparator 34, connected to the register senses the occurrance of the zero count on the register 33 and generates a logic "1" to up-down command 37, which reverses its state causing the binary counter 23 to reverse its counting direction from up to down and the control register to reverse its counting direction from down to up.

At the end of the interval in the sweep period between $f_0$ and $f_0-f\ \Delta$ a total of N unit time periods will have elapsed and the count on register 33 will be "N," corresponding to the frequency out $f_0-f\ \Delta$. Comparator 36, connected to register 33 senses the accumulated "N" count and generates a logic "1" to flip the up-down command to reverse its state, causing the binary counter to count up and the control register to count down from its accumulated count "N." This last reversal of the up-down command causes the frequency out to instantly change from $f_0-f\Delta$ to $f_0+f\Delta$. The above described cycle is repeated with the rate of phase shift decreasing until 00000 count is sensed in the register 33 generating a logic "1" to up-down command 37.

The operation of the device requires a precise number of pulses be generated within a unit time interval $Y/n$. As shown in FIG. 3, the lowest frequency output of the divider for a unit time interval $Y/n$ appears on channel A with the frequencies appearing on channels B–E being higher and binarily related.

As previously explained, in order for the frequency to change linearly, the phase shift change rate must be maintained at a parabolic rate in relation to time.

Figure 5:
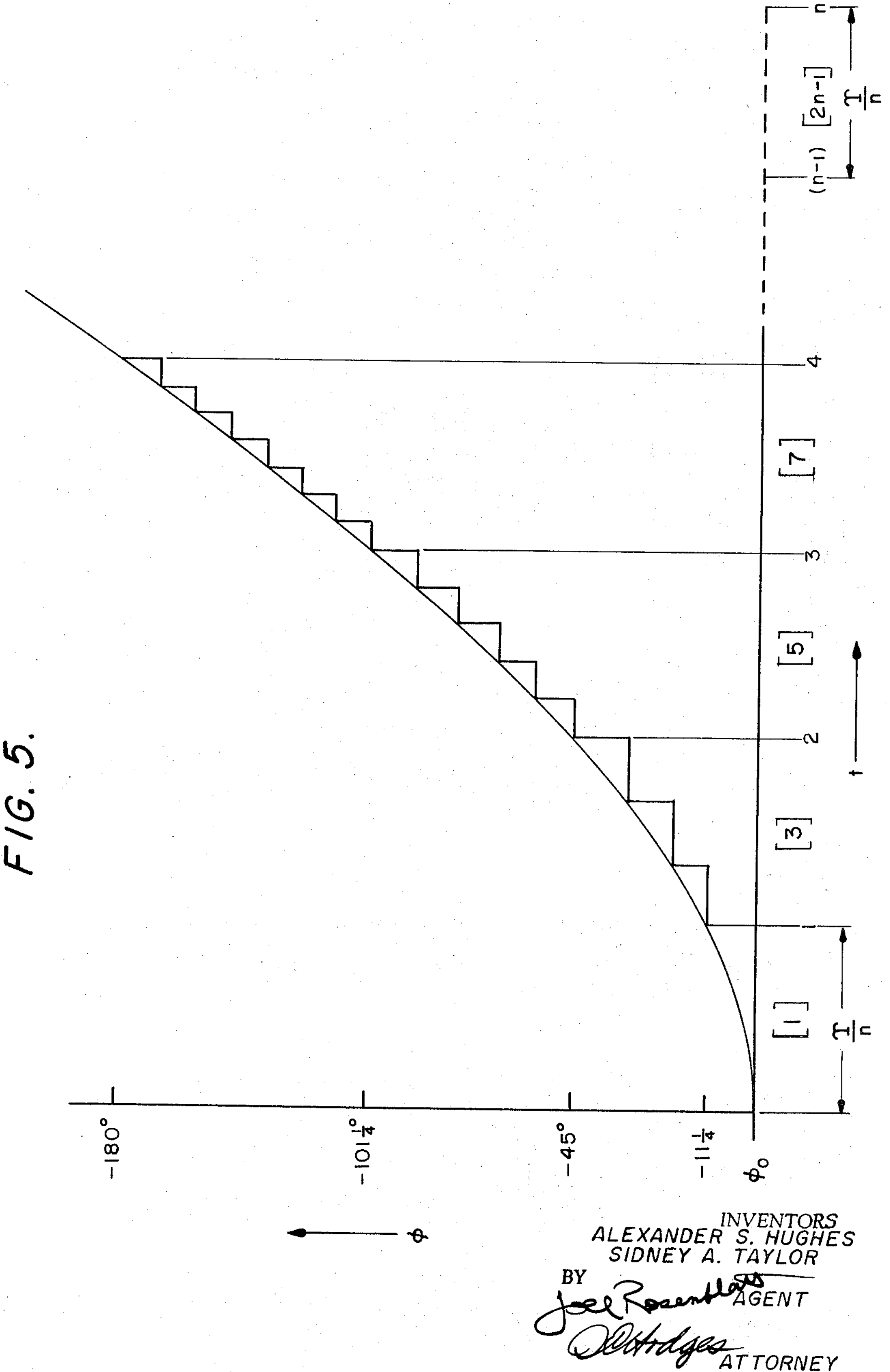
FIG. 5 is a time diagram of the parabolic phase change over a portion of the sweep interval.

This parabolic rate is shown in FIG. 5. The phase shift is incremented one unit of 11 ¼° corresponding to the passage of one unit time interval $Y/n$. As the phase shift changes parabolically with respect to time, the cumulative phase shift over two successive unit time interval at time $t= 2Y/n$ is four increments or a phase shift corresponding to 45° (4 × 11 ¼°). Similarly, at the end of three unit time intervals, at $t= 3Y/n$ the cumulative phase shift must be 101 ¼° (9 × 11 ¼°) and at $t=4Y/n$ the cumulative phase shift must be 180° (16 × 11 ¼°). As can be seen, the phase vector may be rotated past 360° and the total phase shift will be $N^2$ × 11 ¼° at time $t=N$.

The frequency change corresponding to the phase shift shown in FIG. 5, is an increasing change with respect to time. This diagram shown in FIG. 5, is used merely to explain the operation of the device and it is to be understood that the phase may be either increasing or decreasing with time and may be at an increasing or decreasing rate.

Referring now to FIG. 5, the operation of the control register to increment the binary counter parabolically with respect to time is shown for the part of the sweep period between $f=f_0$ and $f=f_0-f_\Delta$. As explained before, at this point the accumulated count on register 33 is 00000 and the accumulated count on binary counter is a maximum value "N" whose magnitude is functionally related to the time duration of the sweep. When $f_0$ is reached the direction of counting for the binary counter is down and up for the register. During this interval of the sweep period, the frequency will change linearly from $f_0$ to $f_0-f_\Delta$, and the phase will decrease at an increasing rate.

At the end of time interval $t=Y/n$, corresponding to a count of 00001 appearing on register 33, the phase shift has been decreased by 11 ¼°. In order for the phase shift to change parabolically with time the phase shift at the end of time interval $t=2Y/n$ must be 45°. As the phase shift is accomplished at 11 ¼° incremental steps, the phase shift must be changed by three additional incremental steps of 11 ¼° bringing the cumulative phase shift at the end of period $t=2Y/n$ to 45°.

This operation is accomplished by gating the output of differentiator channels A and B so that three pulses appear on line $E_0$, decreasing the count on binary counter 23 by three counts, during the time interval between $t= Y/n$ and $t= 2Y/n$. The phase shift corresponding to this change in binary up-down counter count is decreased in three incremental steps at the end of period $2Y/n$. Similarly with respect to the interval between $t= 2Y/n$ and $t= 3Y/n$ the phase shift must be decreased by five incremental steps so that the total accumulative phase shift at the end of period $3Y/n$ is −101 ¼° corresponding to nine incremental phase change steps. This operation is accomplished by gating and combining the output of channels C and channels A so that five pulses are generated on line $E_0$ during the time interval between $t=2Y/n$ and $t=3Y/n$. Similarly, for a period between $t=3Y/n$ and $t=4Y/n$ when seven additional decrements in phase change is required to make the phase change parabolically responsive to time, the gating and combining circuit 31, selects channels A, B and C during the time interval $3Y/n$ to $4Y/n$ so that seven additional pulses during that time interval are transmitted to line $E_0$ to the binary up-down counter decreasing its count and resulting in a cumulative phase change of −180°.

The manner of selecting the appropriate differentiator channels of any particular time interval is now shown.

Figure 4:
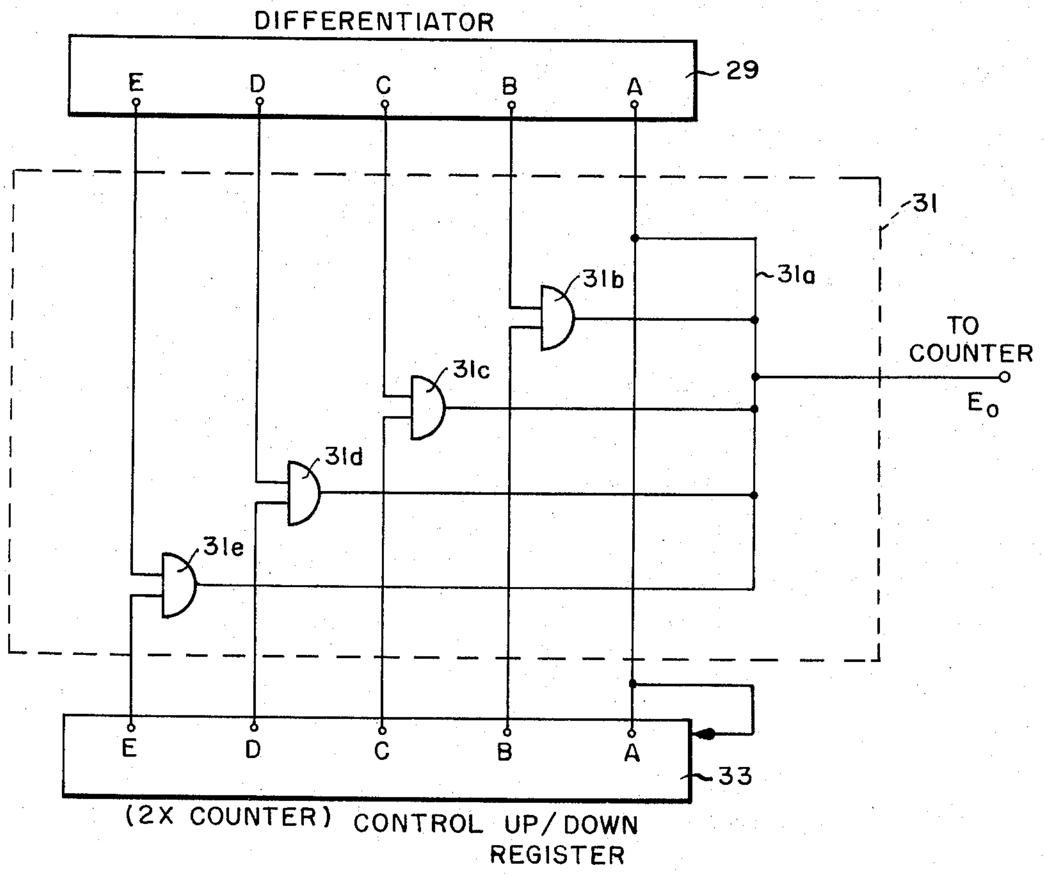
FIG. 4 shows the gating and combining circuit 31, in detail.

Referring to FIG. 4, the differentiator 29 is shown as having output channels A–E. The gating and combining circuit 31 as shown enclosed by the dashed outlines as having a plurality of "and" gates. Each of the "and" gates of the control gating and combining circuit has an input connected to a respective differentiator and to a respective control register channel. For example, "and" gate **31*b* is shown with an input connected to differentiator channel B and with an input to control register channel B. Channel A of the differentiator is directly connected to combining bus 31*a* of the gating and combining circuit and to the 2X counter of the control register 33. The control up-down register employs a counter which counts by two's in response to a single pulse count from channel A of the differentiator 29.**

The outputs of "and" gates **31*b*–31*e* are connected to combining bus 31*a***. The "and" gates select the signals appearing at the output of the channels of the differentiator, combines them and passes these outputs on line $E_0$ and to the binary counter. The "and" gates are set to pass their respective differentiator output in response to a logic of "1," appearing on its respective register terminal and not to pass the output of its respective differentiator channel in respect to the logic of "0" appearing on its respective register terminal.

Referring back to FIGS. 4 and 5 and Table I, where the logic for the control up-down register is shown for each time interval $t=0$ through $t=N$, it is shown how the proper number of pulses are selected by the gating and combining circuit 31 to up-date the binary up-down counter for any particular time interval.

During the time interval between $t=0$ and $t=Y/n$, a single pulse is received by the binary up-down counter from differentiator channel A. At the end of this first time interval the count on the 2X control register will be 00001 so that no outputs will be received in the combining bus **31*a*** except for the single pulse received from the output of channel A of the differentiator. As previously explained, this single pulse changes the count on the binary up-down counter by 00001 and decrements the phase shift by 11 ¼°, during the sweep period $f_0$ to $f_0-f_\Delta$.

TABLE I

| t | Control Register 2X Counter Output B | D | C | B | A | Number of Pulses Generated in Designated Time Interval |
|---|---|---|---|---|---|---|
| 0 | 0 | 0 | 0 | 0 | 0 | 0 |
| 1 | 0 | 0 | 0 | 0 | 1 | 1 |
| 2 | 0 | 0 | 0 | 1 | 1 | 3 |
| 3 | 0 | 0 | 1 | 0 | 1 | 5 |
| 4 | 0 | 0 | 1 | 1 | 1 | 7 |
| $(N-1)$ | | | | | | $(2N-3)$ |
| N | | | | | | $(2N-1)$ |

During the time interval $t/n$, between $t=Y/n$ and $t=2Y/n$, three pulses must appear on line $E_0$, incrementing the binary up-down counter downwardly by three counts. During this interval a second pulse is received by the control up-down register from channel A, raising the count on register 33 from 00001 to 00011, corresponding to an increase of 2 in response to 1 received pulse. During the second time interval, the control register shuts off "and" gates 31*e*, 31*d* and 31*c* and opens gate 31*b* to pass two pulses during the second time interval, which then is combined with the single pulse from channel A of the differentiator on combining bus 31*a*. The number of pulses on line $E_0$ during the second time interval between $t= Y/n$ and $t= 2Y/n$ is now three, corresponding to the two pulses received from channel B and the one pulse received from channel A, which causes the phase shifter to generate a cumulative phase change of −45° as previously explained.

Similarly, during the period between $t=2Y/n$ and $t=3Y/n$, five additional downward decrements of phase change are required. The pulse received from differentiator channel A changes the count on the control register from 00011 to 00101. As can be seen by referrring by inspection of the circuit in FIG. 4, "and" gate 31c is now open. "And" gates 31*b*, 31*d* and 31*e* are closed and the number of pulses received on line $E_0$ during the time interval $t/n$ between $t=2Y/n$ and $t=3Y/n$ are four pulses from channel C and one pulse from channel A, combining on bus 131*a* to produce five pulses and incrementing the binary counter 23 downwardly by five counts.

In the time interval between $t=3Y/n$ and $t=4Y/n$, the single pulse from differentiator A raises the count on the control register from 00101 to 00111, opening gates 31*c* and 31*b* and passing four pulses from channel C, two pulses from channel B and one pulse from channel A, totaling seven pulses which decrease the count on the binary up-down counter and parabolically change the phase shift from −101 ¼° to −180°.

As can be seen in the unit time period *n*, corresponding to the maximum phase shift rate of change, the number of pulses which must be generated is $2n-1$ and in the preceeding period $n-1$, the number of pulses which must appear on line $E_0$ is $2n-3$. As the phase change vector keeps rotating past 360°, to cause a corresponding change in the output frequency of the phase shifter 11, the end count on the binary up-down counter would be a function of the total number $N$ of unit time intervals within the sweep period.

Although the method of up-dating the control register 33 and the binary counter 23 is shown for the sweep period $f_0$ to $f_0-f\,\Delta$ the procedure for up-dating the binary counter and the control register is simply reversed in the sweep period $f_0+f\,\Delta$ to $f_0$, where the accumulated count on the control register 33 is a maximum "N" proportionate to the sweep time interval and the control register is commanded to count down at a decreasing rate until 00000 appears in the register.

Obviously many modifications and variations of the present invention are possible in the light of the above teachings. It is therefore to be understood that within the scope of the appended claims the invention may be practiced otherwise than as specifically described.

What is claimed is:

1. A digitally controlled RF linear sweep generator, comprising:

means for changing the phase of an input RF signal;

means connected to said means for changing the phase for changing the rate of phase shift of an input RF signal;

a binary counter; and said means for changing connected to said binary counter and changing the rate of said phase shift of said RF signal in response to a change in the accumulated count of said counter.

2. The sweep generator of claim 1, including:

means connected to said binary counter for driving said counter and changing the accumulated count; and said counter being incremented at a parabolic rate with respect to time and changing the rate of phase shift parabolically.

3. The sweep generator of claim 2, wherein said RF signal changes linearly with respect to time in response to said parabolic rate of change of said phase shift and said frequency sweep excursion extends from a maximum frequency corresponding to a maximum rate of phase shift in a first direction, through the RF input frequency corresponding to zero rate of phase shift, to a minimum frequency corresponding to a maximum rate of phase shift in a second direction.

4. A digitally controlled RF linear sweep generator, means for changing the phase of an input RF signal;

means connected to said means for changing the phase for changing the rate of phase shift of an input RF signal;

a binary counter;

said means for changing connected to said binary counter and changing the rate of said phase shift of said RF signal in response to a change in the accumulated count of said counter;

said means for changing the phase is a digitally stepped phase shifter;

said means for driving said binary counter comprises a pulse source for producing a plurality of binarily related pulse trains within a unit time period;

gating means for selectively connecting said pulse trains to said counter;

a control register connected to said gating means and to said pulse source;

said control register generating digital commands to said gating means in response to said pulse source; and said gating means selectively connecting said pulse trains to said counter in response to generated digital commands.

5. The sweep generator of claim 4, including:

an up-down command connected to said register and to said binary counter; and said up-down command reversing the counting direction of said binary counter and said register when said sweep frequency is equal to said RF input signal frequency and when said sweep frequency is at its minimum frequency.

6. The sweep generator of claim 5, wherein:

said up-down command reverse the counting direction of said binary counter from down to up, the counting direction of said register from up to down when said sweep frequency is at its sweep minimum; and said up-down command reverses the counting direction of said register from down to up and said binary counter from up to down when said sweep frequency is at said RF input frequency.

7. The sweep generator of claim 6, including:

a comparator connected to said register and to said up-down command;

said up-down command reversing said counting direction of said binary counter from up to down in response to a register count of 00000 sensed by said comparator;

said up-down command reversing said counting direction of said binary counter from down to up in response to a register count of "N" sensed by said comparator; and where "N" is a maximum count having a value functionally related to the number of unit time periods in the sweep interval.

8. The sweep generator of claim 7, wherein:

said gating means includes a plurality of "and" gates;

said pulse source includes a plurality of output terminals, and each of said binarily related pulse trains appears on a respective terminal;

said pulse source lowest frequency signal being directly connected to said control register input; and each of said "and" gates having a first input connected to a respective pulse source terminal and a second input connected to the output of said register with the lowest frequency pulse terminal directly connected to the least significant bit in said register and each successive "and" gate having its inputs connected to the next successively higher frequency pulse terminal and the next more significant bit in said register.

9. The sweep generator of claim 8, wherein said control register count is incremented by two counts for each pulse received by said control register from said pulse source.

10. The sweep generator of claim 4, wherein said control register count is incremented by two counts for each pulse received by said control register from said pulse source.

* * * * *